(12) United States Patent
Patterson et al.

(10) Patent No.: US 10,144,320 B2
(45) Date of Patent: Dec. 4, 2018

(54) TRIM COVER ASSEMBLY WITH ELASTICALLY DEFORMABLE FASTENERS

(71) Applicant: LEAR CORPORATION, Southfield, MI (US)

(72) Inventors: Louella Ann Patterson, Goodells, MI (US); James B. Clauser, Oakland Township, MI (US); Laura Schulz, Bloomfield Hills, MI (US); William Paruszkiewicz, Clinton Twp., MI (US); Pusheng Chen, Novi, MI (US); Thomas A. Welch, Sr., Ortonville, MI (US); Paul S. Severinski, Brownstown, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 14/869,393

(22) Filed: Sep. 29, 2015

(65) Prior Publication Data

US 2017/0088026 A1 Mar. 30, 2017

(51) Int. Cl.
*B60N 2/58* (2006.01)
*B60N 2/90* (2018.01)

(52) U.S. Cl.
CPC ............ *B60N 2/58* (2013.01); *B60N 2/5825* (2013.01); *B60N 2/5858* (2013.01); *B60N 2/914* (2018.02)

(58) Field of Classification Search
CPC ...... B60N 2/58; B60N 2/4415; B60N 2/5825; B60N 2/5858
See application file for complete search history.

(56) References Cited

U.S. PATENT DOCUMENTS

| 4,592,588 | A | 6/1986 | Isono et al. | |
| 4,773,703 | A * | 9/1988 | Krugener | B60N 2/0284 297/284.1 |
| 5,918,696 | A | 7/1999 | Van Voorhies | |
| 5,927,427 | A | 7/1999 | Sewell et al. | |
| 6,851,755 | B2 * | 2/2005 | Dinkel | A47C 4/54 297/284.3 |
| 7,597,398 | B2 * | 10/2009 | Lindsay | B60N 2/0224 297/283.2 |
| 7,618,092 | B2 * | 11/2009 | Yasuda | B60N 2/5816 297/224 |

(Continued)

FOREIGN PATENT DOCUMENTS

| CN | 101193575 A | 6/2008 |
| CN | 101456368 A | 6/2009 |

(Continued)

OTHER PUBLICATIONS

DE 102016218665.5 Office Action dated Sep. 14, 2017; 7 pages.
Office Action for Chinese Application No. CN 201610860065.2, dated Aug. 2, 2018, 9 pages.

*Primary Examiner* — Philip F Gabler
(74) *Attorney, Agent, or Firm* — Brooks Kushman P.C.

(57) ABSTRACT

A trim cover assembly securable over a cushion is provided. The trim cover assembly includes a leather trim material. A trim fastener is attached to the leather trim material for retaining the trim cover to the cushion. Therein the trim fastener elastically deformable so that the fastener that elongates between an extended position and a retracted position to allow the leather trim material to expand while minimizing deformation.

18 Claims, 3 Drawing Sheets

(56) References Cited

U.S. PATENT DOCUMENTS

| | | | |
|---|---|---|---|
| 8,770,662 B2 * | 7/2014 | Mount | B60N 2/5825 112/403 |
| 8,783,768 B2 | 7/2014 | Severinski et al. | |
| 9,586,553 B2 | 3/2017 | Wiegelmann et al. | |
| 2011/0049948 A1 * | 3/2011 | Hobl | B60N 2/5825 297/218.2 |
| 2015/0329030 A1 * | 11/2015 | Wiegelmann | B60N 2/5858 297/452.38 |

FOREIGN PATENT DOCUMENTS

| | | |
|---|---|---|
| CN | 102001300 A | 4/2011 |
| DE | 3631872 C1 | 9/1986 |
| DE | 102010021067 A1 | 11/2011 |
| DE | 102014017605 A1 | 6/2016 |
| EP | 2006152 B1 | 11/2012 |
| JP | 2005053262 A | 3/2005 |
| JP | 2007282839 A | 11/2007 |
| WO | 20070092712 A1 | 1/2007 |
| WO | 2015017277 A1 | 2/2015 |

* cited by examiner

TRIM COVER ASSEMBLY WITH ELASTICALLY DEFORMABLE FASTENERS

TECHNICAL FIELD

The present disclosure relates in general to a leather trim cover assembly for a vehicle seat.

BACKGROUND

Vehicle seats generally have a trim cover for decoratively covering the seat and protecting the cushion. Leather is a common trim cover material for vehicle seats. One example of a leather trim cover assembly is illustrated and described in U.S. Pat. No. 8,783,768 which issued on Jul. 22, 2014 to Lear Corporation.

SUMMARY

In at least one aspect, a vehicle seat assembly is provided with a frame and a cushion supported on the frame. The vehicle seat assembly also includes a movable comfort system. The movable comfort system is adapted to move relative to the frame and cushion between an extended position and a retracted position to provide varying comfort to a user. A trim cover is secured over the cushion and is formed of a leather trim material. A trim fastener is attached to the trim cover at a first end for retaining the trim cover to one of the frame and cushion at a second end. The trim fastener includes an elastomeric material. When the comfort system moves to the extended position, the fastener elastically elongates to allow the trim cover to expand while minimizing deformation of the leather trim material.

In another aspect, the movable comfort system includes an inflatable bladder.

In one other aspect, the trim fastener is positioned laterally adjacent the bladder.

In still another aspect, the elastomeric material has a modulus of elasticity being less than a pressure exerted by inflatable bladder.

In another aspect, the trim fastener further comprises a hook disposed at the second end, wherein the hook is secured to at least one of the cushion and frame.

In yet another aspect, the inflatable bladder is positioned along a central portion of the seat and the trim fastener is attached to the trim cover along an intermediate seam that defines a bolster portion of the seat.

In a further aspect, two trim fasteners are provided. The two trim fasteners are positioned on opposite lateral sides of the inflatable bladder.

In at least one aspect, a trim cover assembly securable over a cushion is provided. The trim cover assembly includes a leather trim material. A trim fastener is attached to the leather trim material for retaining the trim cover to the cushion. The trim fastener includes an elastically deformable material that deforms between an extended position and a refracted position to allow the leather trim material to expand while minimizing deformation.

In another aspect, the trim fastener is attached to the leather trim material along an intermediate seam at a first end.

In still another aspect, the trim fastener is sewn to the trim leather trim material.

In yet another aspect, the trim fastener includes a J-hook disposed at a second end.

In another aspect, the trim cover assembly includes two trim fasteners. The two trim fasteners are positioned on opposite lateral sides of a central portion of the leather trim material.

In still another aspect, the leather trim material further includes two bolster portions connected on opposite lateral sides of the central portion by seams. One trim fastener is attached to the leather trim material along each seam.

BRIEF DESCRIPTION OF THE DRAWINGS

Certain embodiments of the present disclosure are pointed out herein. However, other features of the various embodiments will become more apparent and will be further understood by referring to the following detailed description in conjunction with the accompanying drawings, in which.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except for otherwise expressly indicated, all numerical quantities in this description indicating amounts are to be understood as modified by the word "about" in describing the broader scope of the disclosure. Also, unless expressly stated to the contrary, the description of a group or class of materials as suitable or preferred for a given purpose in connection with the disclosure implies that any two or more members of the group or class may be equally suitable and preferred.

Figure 1:
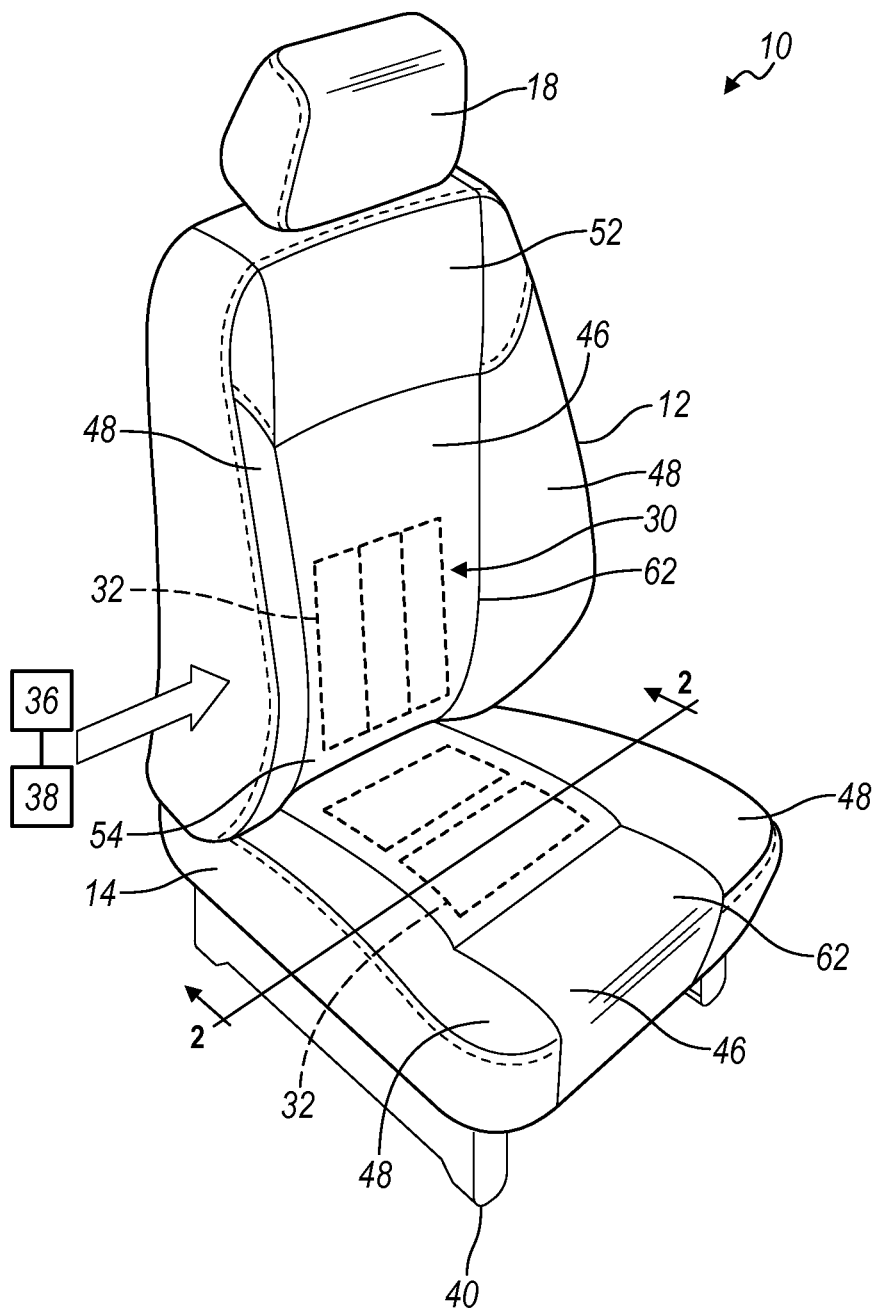
FIG. 1 is a perspective view of an exemplary vehicle seat assembly incorporating an embodiment of a trim cover assembly.

Referring now to the Figures, where like numerals are used to designate like structures throughout the drawings, a vehicle seat assembly 10 in accordance with at least one embodiment of the present invention is shown in FIG. 1. The vehicle seat assembly 10 includes a seat back 12 and a seat bottom 14. As shown, the seat back 12 is commonly pivotally attached to the seat bottom 14. Each of the seat back 12 and the seat bottom 14 typically include a cushion 16 or padding and a trim cover assembly 20 for decoratively covering and protecting the cushion 16.

Typically, the cushion 16 is made of an expandable foam material and is molded to a desired shape. In some applications, such as luxury applications, the trim cover 24 material that forms the outer appearance surface of the trim cover assembly 20 is leather. Leather trim material has little or no elasticity and does not fully recover when stretched, and thus can be considered to have a relatively low recovery or relatively high set.

The vehicle seat assembly 10 may also include a head restraint 18 that is adjustable in relation to the seat back 12. The head restraint 18 is also covered in a trim cover.

The vehicle seat assembly also includes a movable comfort system 30. The comfort system 30 may include a plurality of actuators 32 that move between an extended position and a retracted position. Each actuator 32 may apply pressure or support to the seated passenger. As shown, the plurality of actuators 32 may include a plurality of pneumatic bladders 34 that inflate and deflate to provide various support to the seated passenger along the seat back 12 or seat bottom 14. The actuators 32 may also include movable knobs or paddles. For example, knobs may have a generally semi-spherical support surfaces, whereas paddles maybe have a more planar support surface. However, the actuators 32 may have any contoured shape support surface. The actuators 32 may be formed of a material that has a hardness that is greater than the hardness of the cushion 16, such as hard plastic or harder foam, in order to provide greater support in the extended position. Further, the actuators 32 that extend and retract using any suitable mechanism known to a person having ordinary skill in the art.

The moveable comfort system 30 may also include a compressor 36 that provides a source of air to the bladders 34. The moveable comfort system 30 may also and a controller 38 for regulating compressed air into and out of the bladders 34 or any movement of the actuators 32. The compressor 36 and controller 38 may be provided in the seat back 12, the seat bottom 14 or concealed within the vehicle body. The controller 38 may be a multifunction controller that also controls other functions in the vehicle.

Over time, as the actuators 32 extend and retract, the leather trim material stretches and permanently deforms. The leather trim material does not fully recover, leading to irreversible and unsightly wrinkling of the leather trim cover 24. Since appearance is one of the prime motivating factors in the purchase of a vehicle, the appearance of the leather trim cover 24 for vehicle seats is an important consideration. Moreover, leather seats are often times equipped with climate control systems that require the leather trim cover to have air flow holes. As the leather wrinkles over time, the change in shape may impact the intensity of the holes and affect operability of the climate control system. It would be desirable to improve long-term appearance of leather seats and minimize impact on any climate control functions, if present.

While the vehicle seat assembly 10 is illustrated in FIG. 1 to be a bucket seat assembly, it should be understood that the principles of the present application are applicable to other types of seat assemblies, such as bench, captain and other types of seat assemblies. It should also be understood that the principles of the present application are applicable to all types of vehicle seat assemblies as well as non-vehicle seat assemblies.

Figure 2A:
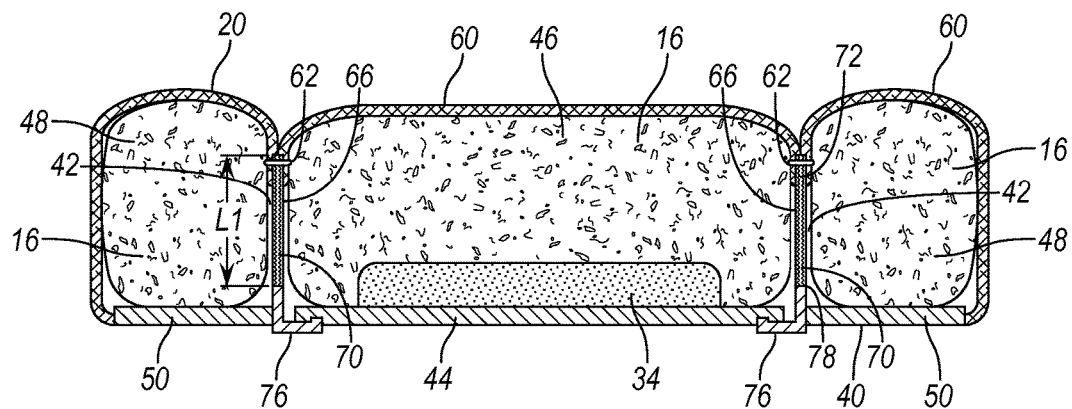
FIG. 2A is a section view of the vehicle seat assembly of FIG. 1 through section 2-2 illustrating the vehicle seat assembly with a comfort system in a retracted position.
Figure 2B:
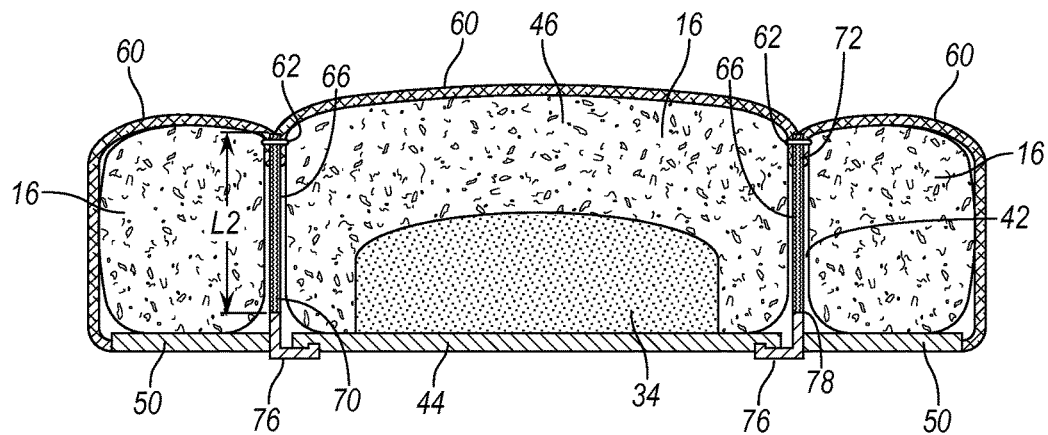
FIG. 2B is the section view of the vehicle seat assembly of FIG. 1 through section 2-2 illustrating the vehicle seat assembly with the comfort system in an extended position.

As shown in the section views FIGS. 2A-2B, the exemplary vehicle seat assembly 10 includes a seat frame 40. The seat frame 40 may have a plurality of mounting brackets adapted to operatively secure the seat frame 40 within a passenger compartment of a vehicle. Any suitable seat frame may be used. The seat frame 40 may be constructed from any material suitable for application within a vehicle seat assembly 10, such as aluminum, steel or other metal alloy, composite material, or a suitable polymer. Further, the seat frame 40 may be manufactured using techniques commonly known in the art, and relative to the type of material employed. By way of example, manufacturing techniques may include stamping, welding, fastening or molding a suitable material to form the seat frame 40.

The vehicle seat assembly 10 includes a movable comfort system 30 including actuators 32 illustrated as inflatable bladders 34. As illustrated in embodiment in FIGS. 2A-2B, the inflatable bladders 34 are positioned between the seat frame 40 and the cushion 16. In the illustrated embodiment, the inflatable bladders 34 are disposed along a central region 44 of the seat frame 40 adjacent a center portion 46 of cushion 16 and between opposing bolster portions 48 of the cushion 16. However, it is contemplated that the actuators 32 may be positioned along any portion of the seat frame 40. For example, actuators 32 may also be located along the side regions 50 of the seat frame 40 adjacent the bolster cushions 48. In another example, actuators 32 may be located in various patterns along upper regions 52 and/or lower regions 54 of the seat frame 40.

The cushion 16 used for vehicle seats 10 is usually constructed with at least one trench or groove, and more typically with several trenches or grooves that define the center cushion portion 46 and bolster cushions portions 48 of the cushion 16. The cushion 16 can have any suitable size, shape and configuration, however in at least one embodiment, the cushion 16 has an average thickness of 0.5 cm to 8 cm, and in at least another embodiment of 1 cm to 5 cm. The cushion 16 can comprise any suitable cushion material, such as a suitable resilient polymer.

In certain embodiments, the cushion 16 comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred.

The trim cover 24 typically includes a plurality of low-recovery material panels 60, such as leather material, are joined together along sewn seam lines 62. The material panels 60 may correspond to respective center cushions 46 and bolster cushions 48, or may form decorative patterns. In either scenario, attachment mechanisms are used to attach the trim cover 24 to vehicle seat 10 in order to cover the cushion 16.

The trim cover assembly 20 includes trim fasteners 66 for connecting the trim cover assembly 20 to one or more components, such as the cushion 16 and/or seat frame 40 As shown in the embodiment in FIGS. 2A-2B, at least one trim fastener 66 includes an elastically deformable segment 70. The elastically deformable segment 70 is formed of elastic material that elastically stretches and elongates along a length of the segment when a force is applied to the elastic material, but returns to an un-stretched, un-deformed length when a force is not applied.

The elastically deformable segment 70 is secured to the trim cover 24 at a first end 72 along one of the sewn seam lines 62. The elastically deformable segment 70 may be secured to the trim cover 24 by sewing the elastic material in the seam line 62. The elastic material may be sewn in one step with a seam line, or may be sewn in a separate step with a second sewn line. It is also contemplated that the first end 72 of the elastic material may be secured to the trim cover 24 by any conventional method, such as adhesive, heat staking, or other methods known to a person of ordinary skill in the art.

The trim fastener 66 may include a clip 76. The clip 76 device secures the trim fastener to at least one of the cushion 16 or the seat frame 40 and is connected at a second end 78 of the elastically deformable segment 70. As shown, the clip 76 may be a hook, such as a J-hook, as shown. The trim fastener 66 extends between the cushion 16 in an opening 42 formed in the cushion 16 or a separation between adjacent cushions, such as between the bolster cushion 48 and the center cushion 46.

The trim fastener 66 is positioned adjacent to the location of the actuators 32 of the comfort system 30. As shown in FIGS. 2A-2B, two trim fasteners are position on the two lateral sides of the bladder 34. By positioning the trim fasteners 66 adjacent to the actuators 32 of the comfort system 30, the trim cover 24 is allowed to expand while minimizing deformation of the leather trim material.

When the comfort system 30 does not apply a force to the trim cover 24 and is in a refracted position, the elastically deformable segment 70 is at first length L1, as illustrated in FIG. 2A. When the comfort system 30 moves to the extended position and a force is applied to the trim cover 24 via the actuators 32, the elastically deformable segment 70 elongates to a stretched length L2 that is greater than L1, as illustrated in FIG. 2B. In the retracted position, the first length L1 may be in the range of 50 mm to 200 mm, and in another embodiment, the first length L1 may be 70 mm to 100 mm. However, the first length L1 may vary in applications depending on the thickness of the cushion 16 and the attachment location, for example.

When the comfort system 30 inflates the bladder 34 to the extended position, the elastically deformable segment 70 elastically elongates to the second position L2 to allow the trim cover 24 to expand with the cushion 16, as shown in FIG. 2B. When the comfort system 30 deflates the bladder 34 to the retracted position, the elastically deformable segment 70 returns to the first position L1 to allow the trim cover 24 to remain tight over the cushion 16. The difference between the first length L1 and a fully stretched length L2 may be from 10 mm to 80 mm. In another embodiment, the difference between the first length L1 and a fully stretched length L2 may be from 20 mm to 60 mm.

The elastically deformable segment 70 may be formed of elastomeric material such as a blend of texturized polyester and rubber, or a blend of nylon and neoprene, or other suitable elastic materials. In another embodiment, the segment 70 may include other elastically deformable segments having an appropriate spring force. The elastically deformable segment 70 may have a modulus of elasticity that is less than the pressure (i.e. force per unit area) at that is applied by the movable comfort system 30. With a modulus of elasticity of the elastically deformable segment 70 being less than the force applied by the movable comfort system 30, the trim cover 24 is allowed to expand before the force deforms the low-recovery trim material 60.

The modulus of elasticity is related to the spring constant of the elastically deformable segment 70. In one embodiment the elastomeric segment has a spring constant in the range of 300 to 600 Newtons per meter (N/m) for an elastomeric segment having a width of 10 cm. In another embodiment, the elastomeric segment has a spring constant of 400-500 N/m for an elastomeric segment having a width W of 10 cm. Depending on the many variables including the length of the elastomeric segment, the amount of inflation of the bladder, other suitable spring constants may be used in other applications.

Figure 3:
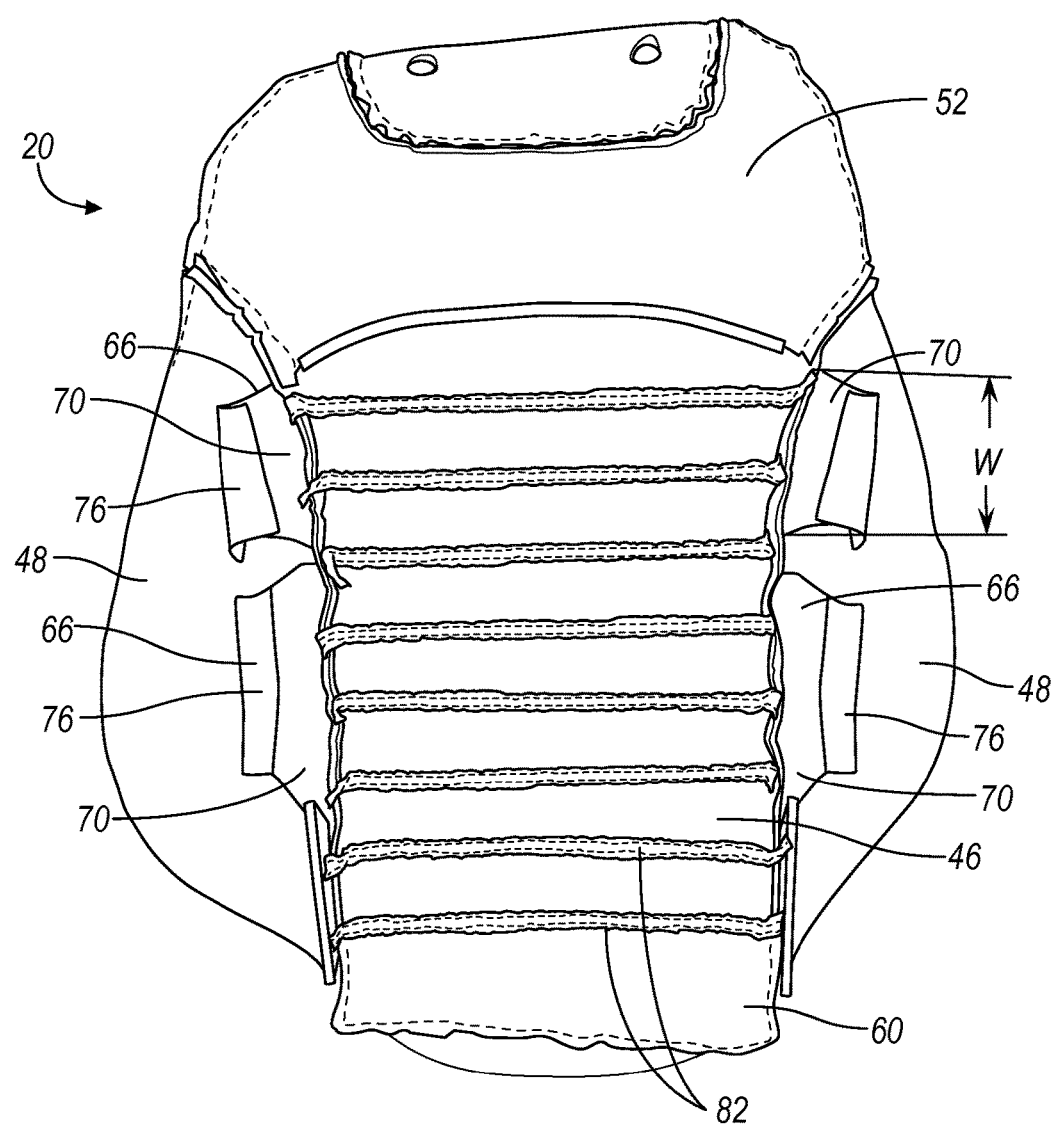
FIG. 3 is a perspective view of the inside of a portion of the trim cover assembly in FIG. 1.

FIG. 3 is a perspective view of the inside of the trim cover assembly 20 for the seat back 12. The elastically deformable segment 70 may also have various widths W, as shown in FIG. 3. The width W may vary in the range of 10 mm-300 mm. The width W of the elastically deformable segment 70 may extend along the length of the seam 62. Elastomeric segments 70 having a greater width W may have a lower modulus of elasticity, and vice versa.

In the embodiment illustrated in FIG. 3, the trim cover assembly 20 includes four trim fasteners 66, each including an elastically deformable segment 70 and a clip 76. Of course, various numbers of trim fasteners 66 with different widths, different spring constants or different moduli of elasticity may be used to account for different forces from specific actuators 32.

The center material panel 60, disposed adjacent a center cushion 46 and the bladder 34, includes reinforcement strips 82. The reinforcement strips 82 may provide additional resistance to deformation of the material panel 60.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a frame;
   a cushion supported on the frame;
   a trim cover having a seating surface and secured over the cushion and inflatable bladder, the trim cover comprising a leather trim material;
   an inflatable bladder that expands and retracts in a vertical direction between an extended position and a retracted position to provide varying comfort to a user, the inflatable bladder disposed between the cushion and the frame and extending the cushion and displacing the seating surface in the vertical direction when moving between the extending and retracted positions; and
   at least two trim fasteners, each positioned on opposite lateral sides of the comfort system, each trim fastener connected to the trim cover at a first end and attached to one of the frame and cushion at a second end for retaining the trim cover to the cushion,
   wherein each trim fastener comprises an elastomeric material, such that when the bladder inflates to the extended position, the fastener elastically elongates to allow the trim cover to expand while minimizing deformation of the leather trim material.

2. The vehicle seat assembly of claim 1 wherein the elastomeric material has a modulus of elasticity less than a pressure exerted by the inflatable bladder.

3. The vehicle seat assembly of claim 1 wherein each trim fastener further comprises a hook disposed at the second end, secured to at least one of the cushion and frame.

4. The vehicle seat assembly of claim 1 wherein the trim cover comprises a central portion connected to at least one bolster portion along at least one intermediate seam,
   wherein the inflatable bladder is positioned along the central portion and at least one of the two trim fasteners is attached to the trim cover along the intermediate seam.

5. The vehicle seat assembly of claim 1, wherein the trim cover comprises two intermediate seams and two bolster portions each connected on opposite sides of a central portion by one of the two intermediate seams, and
   wherein each of the two trim fasteners connected to the trim cover along one of the two intermediate seams.

6. A seat assembly comprising:
a frame;
a cushion supported on the frame and having a seating surface, a cushion thickness defined between the frame and the seating surface;
a trim cover having a seating surface secured over the cushion;
a movable comfort system to provide varying comfort to a user, wherein the comfort system moves relative to the frame and cushion and displaces the seating surface in a thickness direction between a retracted position and an extend position having an extended thickness from the frame that is greater than a retracted thickness; and
at least two elastically deformable trim fasteners each positioned on opposite lateral sides of the comfort system, each of the trim fasteners attached to the trim cover at a first end and attached to one of the frame and cushion at a second end for retaining the trim cover to the cushion,
whereby when the comfort system moves to the extended position, the cushion thickness is increased and the fastener elastically deforms in the thickness direction to allow the trim cover to expand while minimizing deformation of the trim material.

7. The seat assembly of claim 6 wherein the trim fastener is positioned laterally adjacent the movable comfort system.

8. The seat assembly of claim 6 wherein the trim fastener is sewn to the trim cover at the first end.

9. The seat assembly of claim 6 the trim cover comprises a central portion connected to at least one bolster portion along an intermediate seam,
wherein the moveable comfort system is positioned along the central portion, and
wherein at least one of the trim fasteners is attached to the trim cover along the intermediate seam.

10. The vehicle seat assembly of claim 6, wherein the trim cover further comprises two bolster portions each connected on opposite sides of a central portion by one of two intermediate seams, and
wherein each of the two trim fasteners connected to the trim cover along one of the two lateral seams.

11. The seat assembly of claim 6 wherein the trim fastener further comprises a hook disposed at the second end, wherein the hook is secured to at least one of the cushion and frame.

12. The seat assembly of claim 6 wherein the movable comfort system includes an inflatable bladder.

13. A trim cover assembly securable over a cushion, the trim cover assembly comprising:
a leather trim material having a seating surface; and
at least two elastically deformable trim fasteners attached to the leather trim material for retaining the trim material to the cushion, each of the trim fasteners spaced apart laterally,
whereby each trim fastener elastically deforms in a thickness direction being generally perpendicular to the seating surface between an extended position and a retracted position to allow the leather trim material to expand while minimizing deformation,
wherein the leather trim material further comprises two bolster portions connected on opposite lateral sides of a central portion by seams, wherein one trim fastener is attached to the leather trim material along each seam.

14. The trim cover assembly of claim 13 wherein each trim fastener is attached to the leather trim material at a first end.

15. The trim cover assembly of claim 14 wherein each trim fastener is sewn to the trim leather trim material.

16. The trim cover assembly of claim 14 wherein each trim fastener further comprises a hook disposed at a second end.

17. The trim cover assembly of claim 16 wherein the hook further comprises a J-hook at the second end.

18. The trim cover assembly of claim 13 further comprising at least four trim fasteners, wherein two trim fasteners are positioned along each seam.

* * * * *